United States Patent
Oeda et al.

(10) Patent No.: US 6,844,899 B2
(45) Date of Patent: *Jan. 18, 2005

(54) IMAGE RECORDING AND REPRODUCING APPARATUS

(75) Inventors: Hideshi Oeda, Osaka (JP); Masahiro Shioji, Osaka (JP); Hideki Toyoda, Osaka (JP); Masaru Higashide, Osaka (JP)

(73) Assignee: Sanyo Electric Co., Ltd., Moriguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 89 days.

(21) Appl. No.: 09/030,360

(22) Filed: Feb. 25, 1998

(65) Prior Publication Data

US 2001/0012071 A1 Aug. 9, 2001

(30) Foreign Application Priority Data

Feb. 27, 1997 (JP) ................................. 9-43663

(51) Int. Cl.⁷ .................. H04N 5/222; H04N 5/225; H04N 11/00
(52) U.S. Cl. ............... 348/333.13; 348/372; 348/552
(58) Field of Search ....................... 348/333, 334, 348/372, 552, 333.01, 333.13; 345/1, 3; 386/46, 38; 358/906

(56) References Cited

U.S. PATENT DOCUMENTS

| | | | | |
|---|---|---|---|---|
| 4,945,424 A | * | 7/1990 | Hiroki et al. | 348/372 |
| 5,070,406 A | * | 12/1991 | Kinoshita | 348/372 |
| 5,313,305 A | * | 5/1994 | Harigaya et al. | 348/372 |
| 5,479,206 A | * | 12/1995 | Ueno et al. | 348/552 |
| 5,535,011 A | * | 7/1996 | Yamagami et al. | 348/552 |
| 5,631,701 A | * | 5/1997 | Miyake | 348/552 |
| 5,633,678 A | * | 5/1997 | Parulski et al. | 348/552 |
| 5,815,205 A | * | 9/1998 | Hashimoto et al. | 348/552 |
| 5,917,545 A | * | 6/1999 | Kowno et al. | 348/552 |

FOREIGN PATENT DOCUMENTS

| | | | | |
|---|---|---|---|---|
| JP | 64-30969 | | 2/1989 | |
| JP | 03 166880 A | | 7/1991 | |
| JP | 6-153043 | * | 5/1994 | H04N/5/225 |
| JP | 6-181527 | * | 6/1994 | H04N/5/225 |
| JP | 07-046526 A | | 2/1995 | |
| JP | 09-270944 A | | 10/1997 | |

* cited by examiner

Primary Examiner—Ngoc-Yen Vu
Assistant Examiner—Luong Nguyen
(74) Attorney, Agent, or Firm—Armstrong, Kratz, Quintos, Hanson & Brooks, LLP

(57) ABSTRACT

A system controller of a digital still camera turns off power supply of an LCD regardless of on/off position of an LCD switch, when the camera is connected to a personal computer and, hence, an LCD is unnecessary. Therefore, wasteful power consumption can be reduced, and the camera can be driven for a long period of time even by a battery or cell.

6 Claims, 3 Drawing Sheets

IMAGE RECORDING AND REPRODUCING APPARATUS

BACKGROUND OF THE INVENTION

1. Field of the Invention

The present invention relates to an image recording and reproducing apparatus. More specifically, the present invention relates to an image recording and reproducing apparatus having an image pickup mode for picking up and recording an image, and a reproduction mode for reproducing the recorded image.

2. Description of the Related Art

FIG. 4 is a block diagram showing a structure of a conventional digital still camera 10. Referring to FIG. 4, digital still camera 10 includes a mode switch 11, an LCD switch 12, a shutter switch 13, a lens cover switch 14 and a system controller 15. Further, digital still camera 10 includes a lens 21, a CCD (Charge Coupled Device) 22, an A/D converter 23, a signal processing circuit 24, a CPU 25, a flash memory 26, a selector 27, a VRAM 28, a liquid crystal display (LCD) 29, a D/A converter 30, a digital signal input/output terminal 31 and an analog signal output terminal 32.

Mode switch 11 is for switching between the image pickup mode for picking up and recording an image, and a reproduction mode for reproducing the recorded image. LCD switch 12 is for turning on or off power supply to LCD 29 so as to set LCD 29 to a display enabled state or display disabled state. Shutter switch 13 is for taking in image data in the image pickup mode. Lens cover switch 14 is turned on/off by opening/closing a lens cover, not shown.

Even when the image pickup mode is selected by mode switch 11, power supply of the still camera body is not turned on if lens cover switch 14 is not on, that is, if lens cover is not opened. When the reproduction mode is selected by mode switch 11, the power supply of the still camera body is turned on regardless of the state of lens cover switch 14.

System controller 15 performs overall control of digital still camera 10 by outputting a control signal in accordance with the states of switches 11 to 14. When digital signal input/output terminal 31 is connected to a personal computer 41 by means of a cable, system controller 15 outputs a control signal in response to a signal from personal computer 41. In this case, digital still camera 10 is controlled from personal computer 41 except for mode selection and opening/closing of the lens cover.

CCD 22 photoelectrically converts light entering through a lens 21 and generates an image pickup signal. A/D converter 23 converts the image pickup signal generated by CCD 22 to generate digital image data. Signal processing circuit 24 performs white balance correction and γ correction on the digital image data generated by A/D converter 23.

Selector 27 includes a data input terminal 27a and data input/output terminals 27b and 27c and is controlled by a control signal from system controller 15. Terminals 27a, 27b and 27c are connected to signal processing circuit 24, CPU 25 and VRAM 28, respectively. When image pickup mode is selected by mode switch 11, terminals 27a and 27c are rendered conductive to each other, when shutter switch 13 is pressed, terminals 27c and 27b are rendered conductive to each other, and when reproduction mode is selected by mode switch 11, terminals 27b and 27c are rendered conductive to each other.

CPU 25 performs known signal processing such as color separation on image data corresponding to one image plane applied from VRAM 28 through selector 27 in the image pickup mode, performs in software manner, image compression in accordance with JPEG (Joint Photographic Expert Group) method to generate compressed image data, and stores the compressed image data to flash memory 26 in the succeeding stage. CPU 25 decompresses the compressed image data read from flash memory 26 to recover the original image data in the reproduction mode, and writes the image data to VRAM 28 through selector 27. Flash memory 26 has its capacity set in advance so as to allow storage of a prescribed number of still images.

CPU 25 is connected to digital signal input/output terminal 31. Cable connection of digital signal input/output terminal 31 to personal computer 41 allows transfer of the compressed image data from flash memory 26 to a hard disc 43, display of the reproduced image on a monitor 42, printing of the image by a printer 44 and so on.

VRAM 28 stores image data applied from signal processing circuit 24 or CPU 25 through selector 27. LCD 29 includes a liquid crystal panel, a back light, a driving circuit and so on, and displays image data corresponding to one image plane stored in VRAM 28.

D/A converter 30 converts image data from VRAM 28 to analog image signals and outputs the signals to analog signal output terminal 32. By connecting analog signal output terminal 32 to a television receiver 45 by means of a cable, it is possible to display the reproduced image on television receiver 45.

Operation of the digital still camera will be briefly described in the following. In the image pickup mode, when LCD 29 is used as an electronic view finder, LCD switch 12 is turned on. Until shutter switch 13 is pressed in this state, an output from CCD 22 is converted to image data by A/D converter 23, subjected to various processings in signal processing circuit 24, stored in VRAM 28 through selector 27 and an image is displayed on LCD 29. Until shutter switch 13 is pressed, the content stored in VRAM 28 is updated by the output from CCD 22, and therefore LCD 29 is in effect functions as an electronic view finder. During this period, image compression in CPU 25 is not performed, and compressed image data is not stored in flash memory 26. When digital signal input/output terminal 31 and/or analog signal output terminal 32 is connected to personal computer 41 and/or television receiver 45 by means of a cable, monitor 42 and/or television receiver 45 functions as an electronic view finder.

When shutter switch 13 is pressed in this state, image data in VRAM 28 is supplied to CPU 25 through selector 27, subjected to signal processing and compression, and stored in flash memory 26.

In the reproduction mode, compressed image data is read from flash memory 26, and the compressed image data is decompressed by CPU 25 to be returned to the original image data. The image data is written to VRAM 28 through selector 27, and reproduced image is displayed on LCD 29. When digital signal input/output terminal 31 and/or analog signal output terminal 32 is connected to personal computer 41 and/or television receiver 45 by means of a cable, reproduced image is also displayed on monitor 42 and/or television receiver 45.

However, in the conventional digital still camera 10, power consumption of LCD 29 is considerable, and therefore driving time is short when the camera is driven by a battery or cell.

When digital still camera 10 is connected to personal computer 41, it is not necessary to display an image on LCD 29.

SUMMARY OF THE INVENTION

Therefore, an object of the present invention is to provide an image recording and reproducing apparatus capable of reducing wasteful power consumption.

Briefly stated, according to the present invention, when a digital signal output terminal is connected to a processing unit and image display by an image display apparatus is unnecessary, the image display apparatus is set to a display disabled state no matter whether the image display apparatus is set to a display enabled state of display disabled state by a switch. Therefore, wasteful power consumption can be reduced and long time driving is possible even when the image recording and reproducing apparatus is driven by a battery or cell. Preferably, the processing unit is connected to a monitor apparatus, and an image is displayed on the monitor apparatus. The present invention is particularly effective in such a situation.

Preferably, when the digital signal output terminal is not connected to the processing unit in the reproduction mode, the analog signal output terminal is not connected to a television receiver and image display apparatus is absolutely necessary, the image display apparatus is set to the display enabled state no matter whether the image display apparatus is set to the display enabled state or display disabled state by the switch. Therefore, operation of the switch is unnecessary, and the operation is less troublesome.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
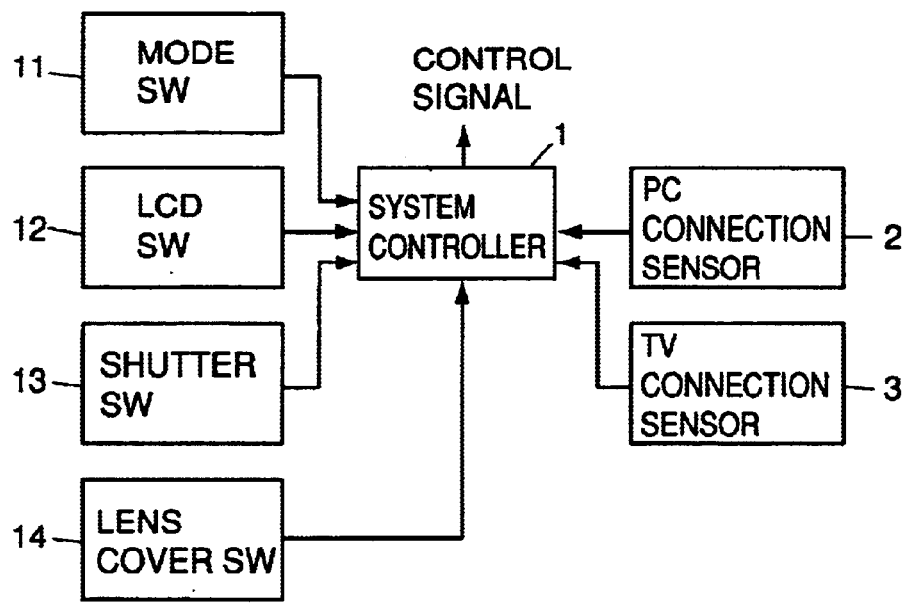
FIG. 1 is a block diagram showing a structure of a main portion of a digital still camera in accordance with one embodiment of the present invention.

FIG. 1 is a block diagram showing a main portion of a digital still camera in accordance with one embodiment of the present invention.

Figure 4:
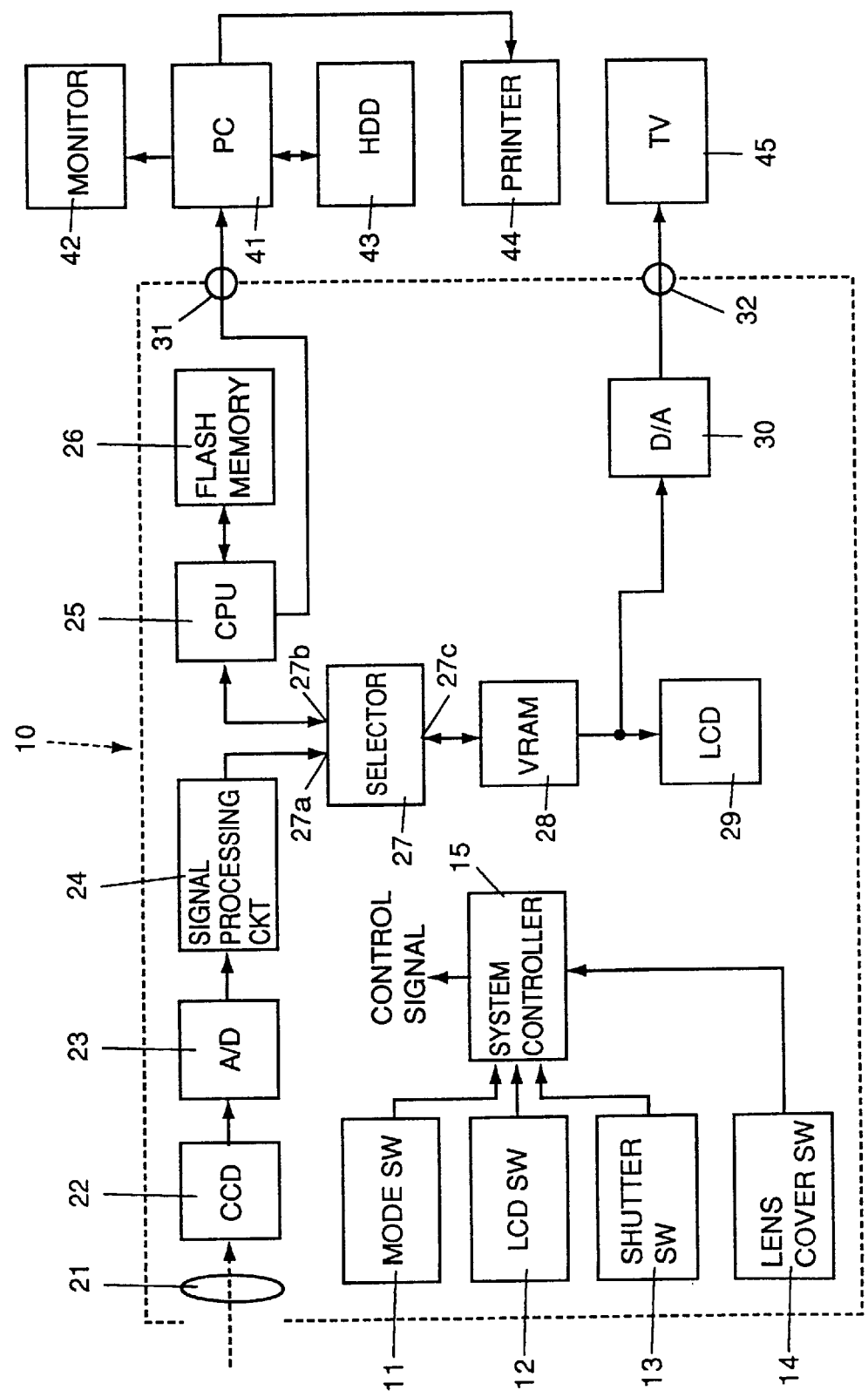
FIG. 4 is a block diagram showing a structure and the state of use of a conventional digital still camera.

Referring to FIG. 1, The digital still camera differs from the conventional digital still camera 10 shown in FIG. 4 in that system controller 15 is replaced by system controller 1, and that a PC connection sensor 2 and a TV connection sensor 3 are newly provided.

Figure 2:
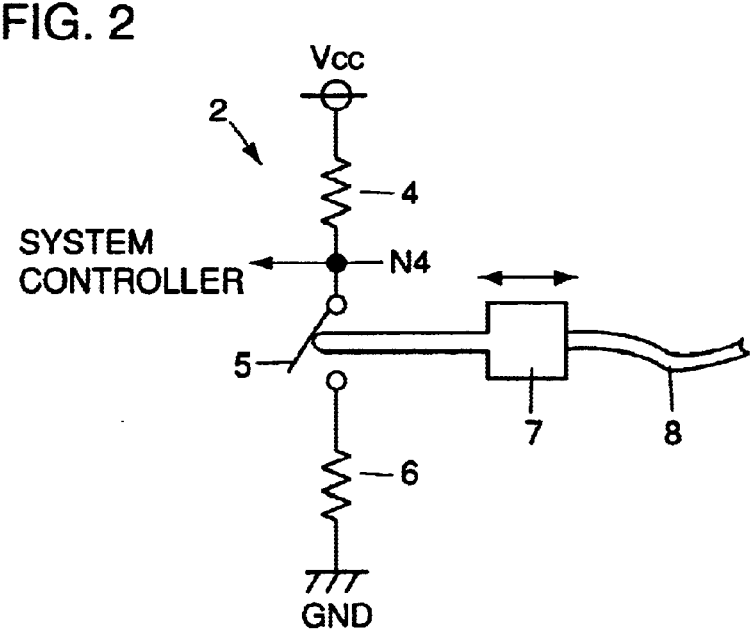
FIG. 2 is a schematic circuit diagram showing a structure and operation of a PC connection sensor shown in FIG. 1.

Referring to FIG. 2, PC connection sensor 2 includes a resistance element 4, a switch 5 and a resistance element 6 connected in series between a line of a power supply potential Vcc and a line of the ground potential GND, and a node N4 between resistance element 4 and switch 5 is connected to system controller 1. Switch 5 is normally conductive and rendered non-conductive when a plug 7 is inserted to digital signal input/output terminal 31. Plug 7 is connected to personal computer 41 by a cable 8.

When plug 7 is not inserted, switch 5 is conductive, and node N4 attains to the voltage level of "L", which voltage is obtained by dividing power supply voltage Vcc by resistance elements 4 and 6. When plug 7 is inserted, switch 5 is non-conductive, and node N4 attains to the level of "H", that is, the level of the power supply voltage Vcc. System controller 1 detects whether the digital still camera is connected to personal computer 41 or not, based on the level of node N4 of PC connection sensor 2.

TV connection sensor 3 has a similar structure as PC connection sensor 2. System controller 1 detects whether the digital still camera is connected to television receiver 45 or not based on an output level of TV connection sensor 3.

Figure 3:
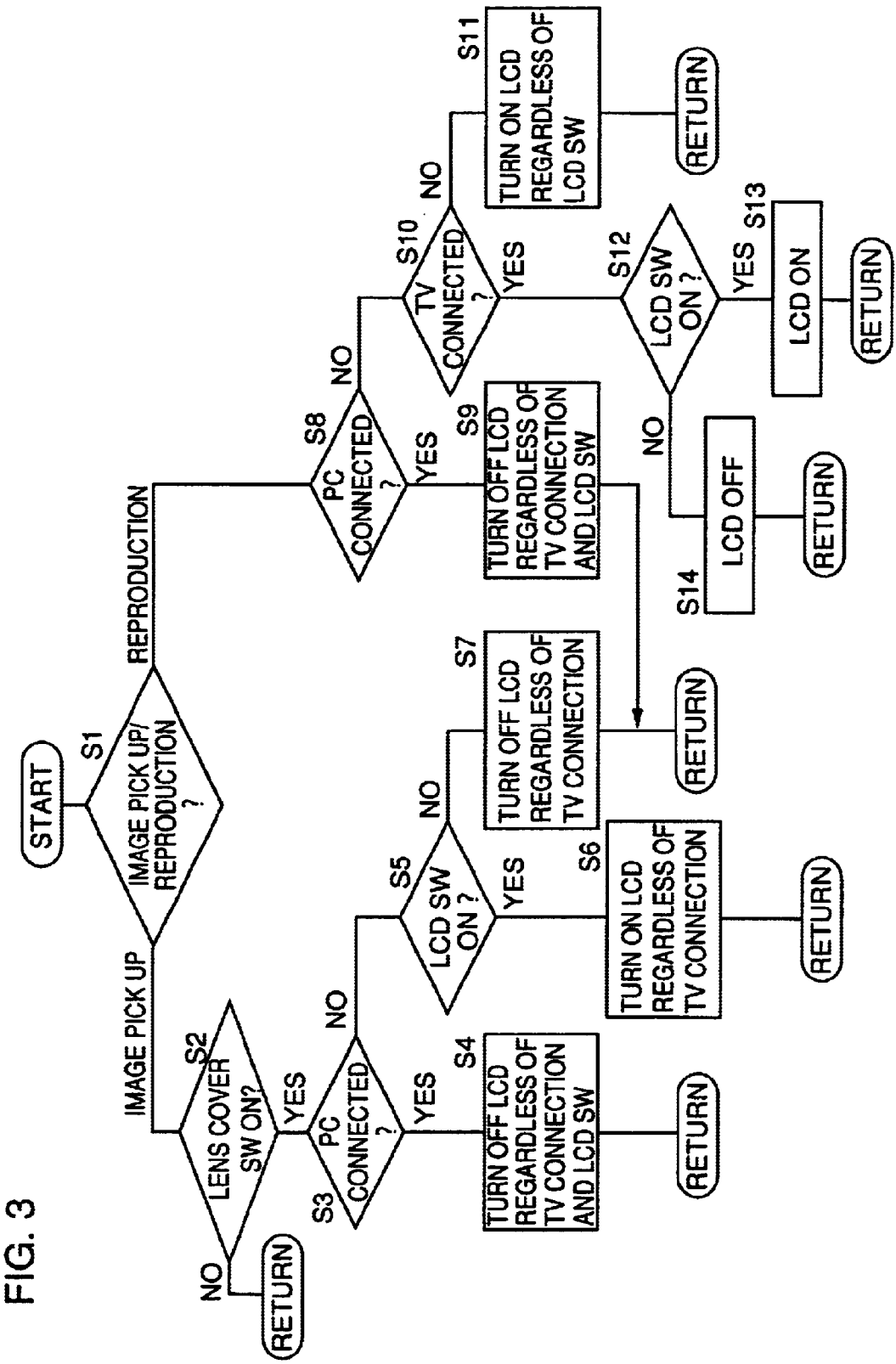
FIG. 3 is a flow chart representing an operation of the system controller shown in FIG. 1.

FIG. 3 is a flow chart representing an operation related to control of LCD 29 by system controller 1.

Referring to FIG. 3, system controller 1 determines, in step S1, whether the digital still camera is set to the image pickup mode or the reproduction mode by mode switch 11, and when it is set to the image pickup mode, the control proceeds to step S2.

In step S2, system controller 1 determines whether lens cover switch 14 is on or not. When lens cover switch 14 is on, the flow proceeds to step S3 and if not, the flow returns to step S1.

System controller 1 determines, in step S3, whether digital still camera is connected to personal computer 41 or not. When it is connected, power supply of LCD 29 is turned off in step S4, no matter whether the digital still camera is connected to television receiver 45 or not, and no matter whether LCD switch 12 is on or off. This is because LCD 29 is unnecessary when digital still camera is connected to personal computer 41, as digital still cameral is controlled by personal computer 41.

When it is determined in step S3 that the digital still camera is not connected to personal computer 41, system controller 1 determines in step S5, whether LCD switch 12 is on or not. When LCD switch 12 is on, power supply of LCD 29 is turned on in step S6 no matter whether the digital still camera is connected to television receiver 45 or not. When it is determined by system controller 1 that LCD switch 12 is not on in step S5, then power supply of LCD 29 is turned off in step S7 no matter whether the digital still camera is connected to television receiver 45 or not. When digital still camera is connected to television receiver 45, LCD 29 may or may not be necessary. Therefore, use of LCD 29 is determined by the user of the digital still camera.

When it is determined in step S1 that the reproduction mode is set, system controller 1 determines in step S8 whether the digital still camera is connected to personal computer 41 or not. When it is connected, power supply of LCD 29 is turned off in step S9 no matter whether the digital still camera is connected to television receiver 45 or not, and no matter whether LCD switch 12 is on or not.

When it is determined in step S8 that the digital still camera is not connected to personal computer 41, system controller 1 determines in step S10 whether the digital still camera is connected to television receiver 45 or not. If it is not connected, power supply of LCD 29 is turned on in step S11, no matter whether the LCD switch 12 is on/off. In step S11, power supply of LCD 29 is turned on regardless of on/off of LCD switch 12, since LCD 29 is necessarily used when the digital still camera is connected neither to personal computer 41 nor television receiver 45 in the reproduction mode.

When it is determined in step S10 that the digital still camera is connected to television receiver 45, system controller 1 determines in step S12 whether LCD switch 12 is on or not. When it is on, power supply of LCD 29 is turned on in step S13, and if LCD switch 12 is not on in step S12, power supply of LCD 29 is turned off in step S14.

Hence other structures and operation are the same as those of the digital still camera shown in FIG. 4, description thereof is not repeated.

In the present embodiment, when the digital still camera is connected to personal computer 41, power supply of LCD 29 is turned off no matter whether LCD switch 12 is on/off. Therefore, wasteful power consumption can be reduced and even when the digital still camera is driven by a battery or cell, long time driving is possible.

When the digital still camera is connected neither to personal computer 41 nor to television receiver 45 in the reproduction mode, power supply of LCD 29 is turned on no matter whether the LCD switch 12 is on/off. Therefore, operation of LCD switch 12 is unnecessary, and operation of the switch is less troublesome.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera having an image pickup mode for picking up and recording an image, and a reproduction mode for reproducing the recorded image, comprising:

an image display apparatus for displaying an image to be picked up or a reproduced image;

a switch operated by a user of said digital camera for instructing start and stop of power supply to said image display apparatus;

a digital signal output terminal for applying a digital image signal to an external processing unit;

a first detection sensor detecting connection of said digital signal output terminal to said processing unit;

an analog signal output terminal applying an analog image signal to an external television receiver to enable image display on said television receiver;

a second detection sensor detecting connection of said analog signal output terminal to said television receiver; and a controller, responsive to an instruction given by said switch, and to results of detection by said first detection sensor and said second detection sensor, for controlling power supply to said image display apparatus, wherein said controller stops power supply to said image display apparatus regardless of whether or not start of power supply is instructed by said switch, or whether or not it is detected by said second detection sensor that said analog signal output terminal is connected to said television receiver, when it is detected by said first detection sensor that said digital signal output terminal is connected to said processing unit, in said pickup mode, and said controller stops power supply to said image display apparatus regardless of whether or not it is detected by said second detection sensor that said analog signal output terminal is connected to said television receiver, if stop of said power supply is instructed by said switch, and supplies power to said image display apparatus regardless of whether or not it is detected by said second detection sensor that said analog signal output terminal is connected to said television receiver, if start of power supply is instructed by said switch, when it is detected by said first detection sensor that said digital signal output terminal is not connected to said processing unit, in said pickup mode.

2. The digital camera according to claim 1, wherein said digital signal output terminal is provided for applying a digital image signal to said processing unit to display said image on a monitor apparatus connected to said processing unit.

3. A digital camera according to claim 1, wherein said controller stops power supply to said image display apparatus regardless of instruction by said switch, or whether or not it is detected by said second detection sensor that said analog signal output terminal is connected to said television receiver, when it is detected by said first detection sensor that said digital signal output terminal is connected to said processing unit, in said reproduction mode, said controller stops power supply to said image display apparatus if stop of said power supply is instructed by said switch, and supplies power to said image display apparatus if start of power supply is instructed by said switch when it is detected by said first detection sensor that said digital signal output terminal is not connected to said processing unit and it is detected by said second detection sensor that said analog signal output terminal is connected to said television receiver, in said reproduction mode, said controller supplies power to said image display apparatus regardless of an instruction by said switch, when it is detected by said first detection sensor that said digital signal output terminal is not connected to said processing unit and it is detected by said second detection sensor that said analog signal output terminal is not connected to said television receiver, in said reproduction mode.

4. The digital camera according to claim 3, wherein said digital signal output terminal is provided for applying a digital image signal to said processing unit so that said image is displayed on a monitor apparatus connected to said processing unit.

5. A digital camera having an image pickup mode for picking up and recording an image, and a reproduction mode of reproducing the recorded image, comprising:

an image display apparatus for displaying an image to be picked up or a reproduced image;

a switch operated by a user of said digital camera for instructing start and stop of power supply to said image display apparatus;

a digital signal output terminal for applying a digital image signal to an external processing unit;

a first detection sensor detecting connection of said digital signal output terminal to said processing unit;

an analog signal output terminal applying an analog image signal to an external television receiver to enable image display on said television receiver;

a second detection sensor detecting connection of said analog signal output terminal to said television receiver; and a controller, responsive to an instruction given by said switch, and to results of detection by said first detection sensor and said second detection sensor, for controlling power supply to said image display apparatus, wherein said controller stops power supply to said image display apparatus regardless of instruction by said switch, or a state of connection detected by said second detection sensor of said analog signal output terminal to said television receiver, when it is detected by said first detection sensor that said digital signal output terminal is connected to said processing unit, in said reproduction mode, said controller stops power supply to said image display apparatus if stop of said power supply is instructed by said switch, and supplies power to said image display apparatus if start of power supply is instructed by said switch when it is detected by said first detection sensor that said digital signal output terminal is not connected to said processing unit and it is detected by said second detection sensor that said analog signal output terminal is connected to said television receiver, in said reproduction mode, said controller supplies power to said image display apparatus regardless of an instruction by said switch, when it is selected by said first detection sensor that said digital signal output terminal is not connected to said processing unit and it is detected by said second detection sensor that said analog signal output terminal is not connected to said television receiver, in said reproduction mode.

6. A digital camera according to claim 5, wherein said digital signal output terminal is provided for applying a digital image signal to said processing unit so that said image is displayed on a monitor apparatus connected to said processing unit.

* * * * *